United States Patent
Miyazaki et al.

[11] Patent Number: 6,038,143
[45] Date of Patent: Mar. 14, 2000

[54] SELF-OSCILLATION TYPE SWITCHING POWER SUPPLY HAVING TIME CONSTANT CIRCUIT ELECTRONIC SWITCH AN EXTERNAL VOLTAGE AND HAVING CHARGING TIME VARIABLE IN RESPONSE TO OUTPUT VOLTAGE

[75] Inventors: Kengo Miyazaki; Yasunori Ijiri, both of Kyoto, Japan

[73] Assignee: Murata Manufacturing Co., Ltd., Japan

[21] Appl. No.: 09/170,846

[22] Filed: Oct. 13, 1998

[30] Foreign Application Priority Data

Oct. 17, 1997 [JP] Japan .................................. 9-285810

[51] Int. Cl.⁷ .................................................. H02M 3/335
[52] U.S. Cl. ................................................................ 363/19
[58] Field of Search ................................. 363/19, 18, 80

[56] References Cited

U.S. PATENT DOCUMENTS

| | | | |
|---|---|---|---|
| 4,763,236 | 8/1988 | Usui | 363/19 |
| 4,942,508 | 7/1990 | Nakamura | 363/19 |

FOREIGN PATENT DOCUMENTS

| | | |
|---|---|---|
| 60170465 | 9/1985 | Japan . |
| 6387170 | 4/1988 | Japan . |

*Primary Examiner*—Shawn Riley
*Attorney, Agent, or Firm*—Ostrolenk, Faber, Gerb & Soffen, LLP

[57] ABSTRACT

A self-oscillation switching power supply including a transformer having a primary winding, a secondary winding, and a feedback winding, and further including a control winding if necessary; a switching transistor for turning on and off the current of the primary winding; a control transistor for controlling a positive feedback signal from the feedback winding or control winding to the switching transistor; and a time constant circuit which is charged by a voltage generated across the feedback winding or control winding and which supplies a control voltage to the control transistor. The self-oscillation switching power supply further comprises an electronic switch which is opened and closed in response to the positive feedback signal from the control winding or feedback winding wherein an external voltage source is connected to the time constant circuit via said electronic switch so that the charging time of the time constant circuit is varied according to an output voltage detection signal.

17 Claims, 12 Drawing Sheets

IMPEDANCE CIRCUIT

IMPEDANCE CIRCUIT

DELAY CIRCUIT

RECTIFYING AND SMOOTHING CIRCUIT

BIAS VOLTAGE
GENERATING CIRCUIT

RECTIFYING AND SMOOTHING CIRCUIT

FIG. 17
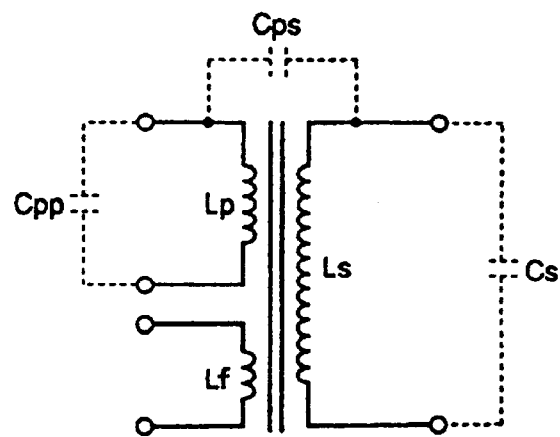
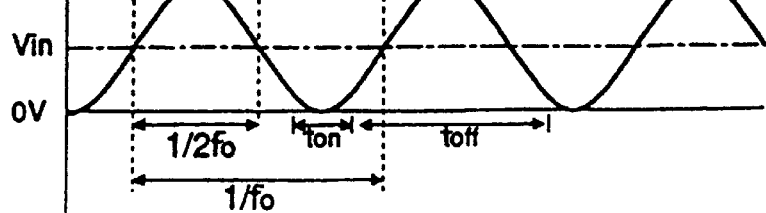
FIG. 18A
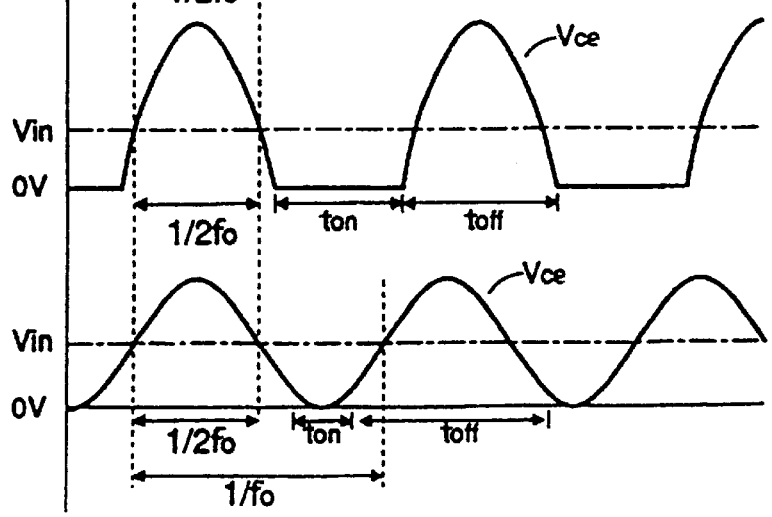
FIG. 18B
FIG. 18C

FIG. 21A (V_Lp) 
FIG. 21B (Ic') 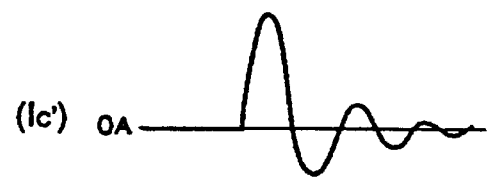
FIG. 21C (I_Lp) 
FIG. 21D (Ic) 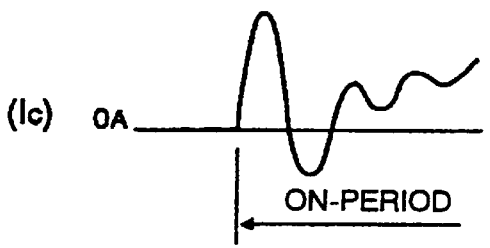

1

SELF-OSCILLATION TYPE SWITCHING POWER SUPPLY HAVING TIME CONSTANT CIRCUIT ELECTRONIC SWITCH AN EXTERNAL VOLTAGE AND HAVING CHARGING TIME VARIABLE IN RESPONSE TO OUTPUT VOLTAGE

BACKGROUND OF THE INVENTION

1. Field of the Invention

The present invention relates to a self-oscillation switching power supply, and more particularly, to a switching power supply for outputting a high voltage.

2. Description of the Related Art

A ringing choke converter is widely used as a self-oscillation switching power supply. FIG. 16 is a circuit diagram of a ringing choke converter according to a conventional technique. In FIG. 16, reference numeral 11 denotes a DC power supply circuit which generates a DC voltage of about 120 V by rectifying and smoothing commercial AC electric power. T denotes a transformer with a primary winding Lp, a secondary winding Ls, and a feedback winding Lf. Q1 denotes a switching transistor connected to the DC power supply via the primary winding Lp of the transformer T. The base of the switching transistor Q1 is connected to a starting resistor R1. The base of the transistor Q1 is also connected to the feedback winding Lf via a current limiting resistor R2, a speed-up capacitor C2, and a diode D2. Furthermore, there is disposed a control transistor Q2 between the base and the emitter of the switching transistor Q1. The feedback winding Lf is connected to a time constant circuit 4 comprising a resistor R5 and a capacitor C3 wherein the voltage across the capacitor C3 is applied to the base of the transistor Q2. The secondary winding Ls of the transformer T is connected to a rectifying and smoothing circuit 2 comprising a rectifying diode D1 and a smoothing capacitor C1. The output side of the rectifying and smoothing circuit 2 is connected to a resistance voltage divider comprising resistors R3 and R4, a variable shunt regulator 12, and a light emitting diode of a photocoupler PC. A phototransistor of the photocoupler PC is disposed in the charging path for charging the capacitor C3.

The power supply shown in FIG. 16 operates as follows. If a DC voltage is applied from the DC power supply circuit 11, a small starting current flows into the base of the switching transistor Q1 via the starting resistor R1. As a result, a current flows through the collector of Q1. This causes a reduction in the collector-emitter voltage and thus a voltage is applied between the terminals of the primary winding Lp of the transformer T. In proportion to this voltage, a voltage is induced across the feedback winding Lf. This induced voltage causes a positive feedback current to be supplied to the base of the switching transistor Q1 via the current limiting resistor R2, the speed-up capacitor C2, and the diode D2. As a result, the transistor Q1 is turned on (into a saturated state). In response to the transition of Q1 into the on-state, a DC voltage is applied between the terminals of the primary winding Lp of the transformer T and a current flows through the primary winding Lp. As a result, the transformer is excited. At the same time, a voltage is induced across the feedback winding Lf whereby the capacitance C3 is charged via the resistor R5, the speed-up capacitor C2, the diode D2, and the phototransistor of the photocoupler PC. When the charging voltage across the capacitor C3 reaches a threshold value (about 0.6 V) of the base-emitter voltage of the control transistor Q2, the base and the emitter of the switching transistor Q1 are short-circuited by Q2 and thus the base current of the switching transistor Q1 is cut off. As a result, Q1 quickly turns off.

2

Herein, the switching transistor Q1 is in the on-state during the period from the time at which the capacitor C3 is started to be charged to the time at which the voltage across the capacitor C3 reaches about 0.6 V. If the switching transistor Q1 turns off, the base of the switching transistor Q1 is reverse-biased to a negative value by a voltage induced across the feedback winding Lf. At the same time, the capacitor C3 is forced to be discharged (reversely charged) by the feedback winding Lf via the resistor R5. As a result, the base of the control transistor Q2 is reverse-biased to a negative voltage. Thus, the transistor Q2 is maintained in the off-state until the excited energy of the transformer T is entirely released from the secondary winding Ls. If the excited energy of the transformer T is entirely released, the voltage induced across the feedback winding Lf disappears quickly. However, a ringing voltage (kick voltage) is generated by the leakage inductance and the distributed capacitance of the transformer T whereby the base of the switching transistor Q1 is forward-biased and thus the switching transistor Q1 turns on again. The above-described turning on and off occurs periodically and the oscillatory operation grows into a continuous oscillation.

If the output voltage appearing between the terminals of the rectifying and smoothing circuit 2 is denoted by Vout, the current flowing through the load is denoted by Iout, the inductance of the primary winding Lp is denoted by Lp, and the peak value of the collector current of the switching transistor Q1 is denoted by Icp, then the output voltage Vout can be approximated by the following equation.

$$\text{Vout} = (Lp \cdot Icp^2)/(2Iout) \quad (1)$$

Furthermore, if the on-period of the switching transistor Q1 is denoted by ton, and the voltage applied between the terminals of the primary winding Lp during the on-period is denoted by Vin, then Icp is given by the following equation.

$$Icp = (\text{Vin}/LP)ton \quad (2)$$

According to the relationships given by equations (1) and (2), it is possible to detect the output voltage and control the current of the phototransistor of the photocoupler PC thereby controlling the on-period ton of the switching transistor Q1 so that the output voltage Vout is maintained at a fixed value.

In the conventional self-oscillation switching power supply shown in FIG. 16, a step-down transformer is employed as the transformer T, and the output voltage Vout is limited to a rather low voltage such as 5 V. Using the circuit configuration shown in FIG. 16, it is possible to produce a power supply capable of generating a high voltage by increasing the ratio of the number of turns of the secondary windings Ls to that of the primary winding Lp of the transformer T. However, such a power supply will have the following problems.

FIG. 17 is a circuit diagram of a transformer wherein Cs denotes a distributed capacitance appearing across the secondary winding Ls, and Cps denotes a distributed capacitance appearing between the primary winding Lp and the secondary winding Ls. Cpp denotes a capacitance which is placed between the terminals of the primary winding Lp to equivalently replace the distributed capacitances Cs and Cps. For example, in copying machines and page printers of the electrophotographic type, a power supply is required to convert a DC input voltage of a few ten volts to a DC or AC voltage of an increased value of about a few hundred or thousand volts. To meet such a requirement, the high-voltage transformer should have an extremely high ratio of the number of turns of the secondary winding Ls to that of the primary winding Lp. If the number of turns of the primary winding Lp is denoted by Np, the number of turns of the secondary winding Ls is denoted by Ns, and the values of the distributed capacitances Cs and Cps are denoted by Cs and Cps, then the equivalent distributed capacitance Cpp between the terminals of the primary winding can be approximated by the following equation.

$$Cpp=(Cs+Cps)\times(Ns/Np)^2 \tag{3}$$

This means that the capacitance Cpp of the high-voltage transformer becomes extremely high compared to that of the low-voltage transformer. Furthermore, if the inductance of the primary winding Lp is denoted by Lp, then the intrinsic resonance frequency fo of a parallel combination of the inductance Lp of the primary winding and the equivalent capacitance Cpp across the primary winding is given by the following equation.

$$fo=1/(2\pi(Lp\cdot Cpp)^{1/2}) \tag{4}$$

From this equation, it can be seen that the resonance frequency fo of the high-voltage transformer is lower than that of the low-voltage transformer.

If the transformer T shown in FIG. 16 is replaced with the high-voltage transformer shown in FIG. 17, the operation becomes very different in that the high-voltage transformer has a free oscillation at a resonance frequency fo determined by equation (4) during the period from the instant at which the switching transistor Q1 turns off to the instant at which it turns on again. In the conventional low-voltage switching power supply shown in FIG. 16, the oscillation frequency varies to a great extent depending on the output power consumption. More specifically, as the output power consumption decreases, it becomes possible to excite the low-voltage transformer T in a shorter on-period. As a result, the oscillation frequency tends to become higher. The capacitance Cpp in equation (3) for the low-voltage transformer T is very small, and the intrinsic resonance frequency of the transformer is very high, and thus oscillation even at a few hundred kHz is possible. In contrast, the high-voltage transformer has a very low intrinsic resonance frequency fo, as described above, and therefore, it is difficult to achieve oscillation at a frequency higher than the intrinsic resonance frequency even when there is no load which consumes the output power.

FIGS. 18A to 18C illustrate the waveforms of the collector-emitter voltage of the switching transistor for various output voltages (currents). In order to vary the output voltage (current) over a wide range using the high-voltage transformer, it is required to vary the amplitude of the collector-emitter voltage Vce of the switching transistor Q1 while maintaining the repetition frequency at the resonance frequency fo as shown in FIG. 18. To this end, the switching transistor Q1 should operate over a wide operating range including both in a saturation region and in an unsaturated region. When the switching transistor Q1 operates in the unsaturated region, the positive feedback voltage appearing across the feedback winding Lf has a sinusoidal voltage waveform having a decreasing amplitude, as shown in FIG. 18C. In this operation region, the on-period of the switching transistor Q1 becomes short and the peak value of the positive feedback voltage across the feedback winding Lf decreases. However, it is still required to reduce the on-period of the switching transistor Q1 in response to the feedback signal given via the photocoupler PC and thus the capacitor C3 is charged via the phototransistor, which is in the initial saturated state, of the photocoupler PC. During this process, the feedback winding Lf is substantially short-circuited by the path including the diode D2, the phototransistor of the photocoupler PC, and the capacitor C3. As a result, the capacitor C3 is further charged without supplying a positive feedback current from the feedback winding into the base of the switching transistor Q1. As a result, a delay occurs in the supply of the base current from the positive feedback winding Lf to the switching transistor Q1. This causes the control transistor Q2 to turn on before the switching transistor Q1 turns on, and thus the switching transistor Q1 operates in an intermittent manner in which the switching transistor Q1 becomes alternately saturated and unsaturated. Therefore, it is impossible to achieve stable control and the output voltage includes large ripples.

Leakage inductance of the transformer is another problem which occurs when the low-voltage transformer T shown in FIG. 16 is replaced with the high-voltage transformer shown in FIG. 17. FIG. 19 illustrates an equivalent circuit of the high-voltage transformer and the switching transistor. In FIG. 19, L1 and L2 denote leakage inductance and Lp denotes the exciting inductance of the primary winding. Cpp denotes the equivalent primary-side distributed capacitance shown in FIG. 17. If the inductance component of the leakage inductances L1 and L2 is denoted by $L_{1e}$, then the series resonance frequency fo' is given by the following equation.

$$fo'=1/(2\pi(L_{1e}\cdot Cpp)^{1/2}) \tag{5}$$

As described above, the high-voltage transformer has a very large equivalent primary-side capacitance Cpp and thus a rather low series resonance frequency fo' determined by equation (5). Although the series resonance frequency fo' varies depending on the leakage inductance $L_{1e}$, a typical value is of the order of 6 to 10 times the parallel resonance frequency given by equation (4). That is, the series resonance frequency is rather close to the parallel resonance frequency. Therefore, if the high-voltage transformer with such characteristics is applied to the circuit shown in FIG. 1, a ringing component is superimposed on the collector-emitter voltage Vce of the switching transistor Q1 as shown in FIGS. 20A to 20C. The high-voltage power supply is required to have the capability of varying the output voltage (current) over a wide range. To meet this requirement, if the voltage induced across the secondary winding Ls of the high-voltage transformer is varied over a wide range by adjusting the on-period of the switching transistor Q1, the collector-emitter voltage of the switching transistor Q1 varies as shown in FIG. 20. As can be seen from FIGS. 20A to 20C, the series resonance frequency component described in equation (5) becomes more dominant with the reduction in the on-period of the switching transistor Q1.

In the conventional circuit shown in FIG. 16, the capacitor C3 is discharged by the voltage induced across the feedback winding Lf and charged by the voltage induced across the feedback winding Lf and the current passing through the phototransistor of the photocoupler PC. In such a circuit configuration, when the circuit is in the oscillating state shown in FIG. 20C, the time constant circuit 4 responds to the series resonance frequency fo' because the time constant circuit 4 is formed with passive elements. As a result, the control transistor Q2 also responds to the series resonance frequency component. As a result, the switching transistor Q1 operates not in the parallel resonance mode which is the right operation mode in which the transistor Q1 should be operated, but in the series resonance mode. This causes an unstable circuit operation such as intermittent oscillation. Furthermore, because the switching transistor Q1 turns on and off at a high frequency, the switching loss increases and thus it becomes necessary to employ a larger-size heat sink.

Furthermore, since the high-voltage transformer has, as described above, an extremely high equivalent primary-side distributed capacitance Cpp compared to the low-voltage transformer, a large excess current flows when the switching transistor turns on. The waveform of the collector current of the switching transistor Q1 and some other related waveforms are shown in FIGS. 21A to 21D. FIGS. 22A and 22B are waveforms illustrating the relationship among the collector voltage and current and the base voltage and current of the switching transistor Q1. In FIGS. 21A to 21D, $V_{Lp}$ is the waveform of the voltage applied to the primary winding, Ic' is the current flowing through the equivalent primary-side distributed capacitance Cpp, $I_{Lp}$ is the primary winding current, and Ic is the collector current of the switching transistor Q1. When the switching transistor Q1 turns on, an excessively large value of current Ic' flows into Cpp thereby initially charging Cpp. After completion of the charging, oscillation occurs due to the resonance between Cpp and the leakage inductances (L1, L2). The amplitude of the oscillation decreases with time. The sum of Ic' and $I_{Lp}$ flows through the collector of the switching transistor Q1, and thus an initial current of Ic with an excessively large value flows as shown in FIG. 21D. After that, the waveform of Ic includes a component increasing at a rate $V_{Lp}/L_p$ and a ringing component. This ringing component superimposed on the collector current Ic adversely affects the control operation of the circuit based on the technique in which the output is stabilized by controlling the on-period of the switching transistor Q1. More specifically, an intermittent operation is an example of the adverse effect.

In FIGS. 22A and 22B, Vce is the collector-emitter voltage of the switching transistor Q1, Ic is the collector current of Q1, Vbe is the base-emitter voltage of Q1, and Ib is the base current of Q1. A great amount of switching loss is produced, as represented by the hatched area in FIG. 22A, by the product of the collector-emitter voltage of the switching transistor Q1 and the excessive current which flows through the collector of the switching transistor Q1 when it turns on.

In general, the output of the high-voltage power supply is turned on/off not by turning on/off the input power but in response to a remote control signal given from the outside of the high-voltage power supply while maintaining the input power supply in the on-state. In this case, the high-voltage power supply is required to have a steep rising-up characteristic without overshoot. In the conventional power supply shown in FIG. 16, a transistor serving as a remote switch may be disposed between the base and the emitter of the switching transistor Q1 so that the transistor is remote-controlled in response to an external signal. In this case, at the instant at which the remote-switching transistor turns off in response to a starting signal given from the outside, a starting current is supplied from the DC power circuit 11 to the base of the switching transistor Q1 via the starting resistor R1 and an oscillation starts. At the instant at which the oscillation starts, the output voltage on the secondary side is equal to 0 V and the phototransistor of the photocoupler PC is in an open state. Therefore, at the instant immediately after the start of oscillation, the charging time constant is determined by the resistor R5 and the capacitor C3. As a result, the on-period of the switching transistor Q1 has a maximum value at the instant at which the oscillation starts. Because this maximum value of the on-period is much greater than the rated value in the normal state, an initial voltage corresponding to the maximum on-period is induced across the secondary winding Ls and thus a great overshoot occurs.

A technique widely used to prevent the above problems in the conventional high-voltage power supply is to control the DC input voltage applied to the primary winding of the high-voltage transformer, as shown in FIG. 23, so as to obtain a stable output, instead of controlling the on-period of the switching transistor Q1. In FIG. 23, Q5 is a control power transistor which reduces the voltage of a DC input power supply 1 thereby controlling the input voltage applied to a high-voltage transformer T. In response to the signal detected by an output voltage detection circuit, a controller controls the base current of the transistor Q5 so as to obtain a stabilized output voltage. The switching transistor Q1 is periodically turned on and off at fixed time intervals by an oscillator.

However, because the switching power supply shown in FIG. 23 is based on the externally excited switching circuit, not only an external oscillator is required but also an additional power transistor for generating a reduced voltage input to the high-voltage transformer is required. Thus, the circuit becomes complicated in configuration and large in size.

SUMMARY OF THE INVENTION

It is an object of the present invention to solve the above problems thereby providing a self-oscillation switching power supply using a high-voltage transformer, capable of handling a wide range of load variation or capable of varying the output voltage (current) over a wide range.

It is another object of the present invention to solve the problem arising when the switching transistor falls into a series resonant state thereby making it possible to handle a wide range of load variation or making it possible to vary the output voltage (current) over a wide range, and furthermore suppressing switching losses.

It is still another object of the present invention to provide a self-oscillation switching power supply in which the output voltage rises in response to a remote control signal without generating an overshoot.

According to an aspect of the present invention, there is provided a self-oscillation switching power supply comprising: a transformer including a primary winding, a secondary winding, and a feedback winding, and further including a control winding if necessary; a switching transistor for turning on and off the current of the primary winding; a control transistor for controlling a positive feedback signal from the feedback winding or control winding to the switching transistor; and a time constant circuit which is charged by a voltage generated across the feedback winding or control winding and which supplies a control voltage to the control transistor, the self-oscillation switching power supply including an electronic switch which is opened and closed in response to the positive feedback signal from the control winding or feedback winding wherein an external voltage source is connected to the time constant circuit via the electronic switch so that the charging time of the time constant circuit is varied according to a signal representing the output voltage detected, thereby ensuring that the charging time of the time constant circuit is controlled in a stable manner.

The time constant circuit may include a series circuit of a resistor and a capacitor, so that the voltage across the charged capacitor is output as the control voltage supplied to the control transistor, and the electronic switch is disposed between the external voltage source and the capacitor.

The electronic switch may be formed with a transistor which is turned on by the positive feedback voltage of the control winding or feedback winding and there is provided a diode for discharging the charge of the capacitor into the control winding or feedback winding when the transistor turns off.

In this circuit configuration, the charging time of the time constant circuit is controlled by applying a voltage from the external voltage source to the time constant circuit, and the charging can be performed without causing the feedback winding to be short-circuited. Therefore, the control transistor does not have a premature operation due to a delay in the supply of the positive feedback signal from the feedback winding to the switching transistor. This ensures that the charging time can be controlled in a stable fashion without encountering an intermittent operation.

The self-oscillation switching power supply may further comprises an impedance circuit between the time constant circuit and the control voltage input part of the control transistor so that the impedance circuit prevents the control transistor from being reverse-biased by the feedback winding or control winding. In this circuit configuration, because the control transistor is prevented from being reverse-biased, its response ability at high frequencies becomes low and thus the switching transistor is prevented from oscillating at a high frequency. This makes it possible to vary the output voltage (current) over a wide range in a stable fashion. Furthermore, the switching loss due to the high-frequency oscillation of the switching transistor can also be prevented.

The control signal input part of the switching transistor may be connected to a delay transistor for causing the switching transistor to have a delay in the turning-on timing and there is provided an impedance circuit between the control voltage input part of the delay transistor and the control winding or feedback winding so that the impedance circuit prevents the delay transistor from being reverse-biased by the control winding or feedback winding. Alternatively, there may be provided an impedance circuit between the control voltage input part of the control transistor and the control winding or feedback winding so that the impedance circuit prevents the control transistor from being reverse-biased by the control winding or feedback winding. In either circuit configuration, the control transistor or the delay transistor is prevented from being reverse-biased. That is, when the switching transistor turns on, a voltage is generated across the control winding or feedback winding, which would otherwise cause the control transistor or the delay transistor to be reverse-biased. However, the impedance circuit prevents the control transistor or the delay transistor from being reverse-biased, and thus the control transistor or the delay transistor turns off after a short delay due to the effect of carrier accumulation in the transistor. During the above process, the switching transistor is maintained in the off-state. When the voltage applied to the switching transistor becomes low enough, the switching transistor turns on. This suppresses an excess current which charges the capacitance associated with the primary winding of the high-voltage transformer thereby ensuring that the output voltage (current) can be controlled over a wide range in a stable fashion by controlling the on-period of the switching transistor using the control transistor. Furthermore, the switching loss which occurs when the switching transistor turns on is also reduced.

In the self-oscillation switching power supply, the control signal input part of the switching transistor may be connected to a delay transistor for causing the switching transistor to have a delay in the turning-on timing and there is provided a delay circuit for delaying the positive feedback signal from the control winding or feedback winding by an amount corresponding to a fixed time constant and supplying the resultant delayed signal as the control signal to the delay transistor. Alternatively, there may be provided a delay circuit for delaying the positive feedback signal from the control winding or feedback winding by an amount corresponding to a fixed time constant and supplying the resultant delayed signal as the control signal to the control transistor. In either circuit configuration, the control transistor is driven by a voltage having a phase delay relative to the voltage induced across the control winding or the feedback winding and thus the switching transistor turns on after a delay corresponding to the delay of the delay circuit. As a result, the switching transistor turns on when the voltage applied to the switching transistor becomes low enough. This suppresses an excess current which charges the capacitance of the high-voltage transformer and also suppresses the amplitude of a ringing component flowing through the switching transistor during the on-period thereby ensuring that the output voltage (current) can be controlled over a wide range in a stable fashion by controlling the on-period of the switching transistor using the control transistor. Furthermore, the switching loss which occurs when the switching transistor turns on is also reduced.

Furthermore, the control signal input part of the switching transistor may be connected to a delay transistor for causing the switching transistor to have a delay in the turning-on timing and there is provided a bias voltage generating circuit between the control voltage input part of the delay transistor and the control winding or feedback winding so that the bias voltage generating circuit is charged by the voltage generated across the control winding or feedback winding thereby providing a DC bias voltage to the control voltage applied to the delay transistor. Alternatively, there may be provided a bias voltage generating circuit between the control voltage input part of the control transistor and the control winding or feedback winding so that the bias voltage generating circuit is charged by the voltage generated across the control winding or feedback winding thereby providing a DC bias voltage to the control voltage applied to the control transistor. In either circuit configuration, the control transistor or the delay transistor is controlled by the sum of the voltage induced across the control winding and the negative DC component superimposed on the induced voltage. Therefore, the switching transistor turns on when the voltage applied to the switching transistor becomes low enough. This suppresses an excess current which charges the capacitance of the high-voltage transformer and also suppresses the amplitude of a ringing component flowing through the switching transistor during the on-period thereby ensuring that the output voltage (current) can be controlled over a wide range in a stable fashion by controlling the on-period of the switching transistor using the control transistor. Furthermore, the switching loss which occurs when the switching transistor turns on is also reduced.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIG. 17 is a circuit diagram of a transformer.

FIGS. 18A to 18C are diagrams illustrating the changes in the waveform of the collector-emitter voltage of a switching transistor, which occurs when the load changes.

FIGS. 20A to 20D are diagrams illustrating the changes in the waveform of the collector-emitter voltage of the switching transistor, which occurs with the change in the on-period of the switching transistor.

FIGS. 21A to 20D are diagrams illustrating the voltage and current waveforms for various points in FIG. 19.

DETAILED DESCRIPTION OF EMBODIMENTS OF THE INVENTION

Hereinafter, the preferred embodiments of the present invention are explained in detail with reference to the drawings.

Figure 1:
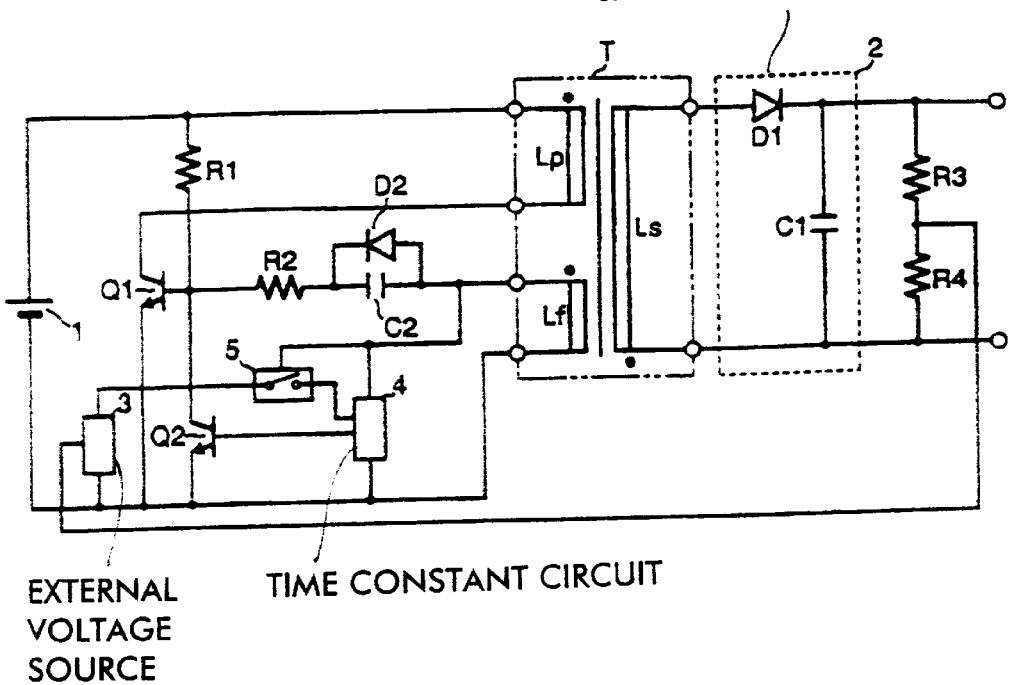
FIG. 1 is a circuit diagram illustrating a general example of a circuit configuration of a self-oscillation switching power supply according to a first embodiment.

FIG. 1 is a circuit diagram illustrating a general example of a circuit configuration of the self-oscillation switching power supply according to a first embodiment of the present invention. In FIG. 1, reference numeral 1 denotes an input power supply, T denotes a high-voltage transformer including a primary winding Lp, a secondary winding Ls, and a feedback winding Lf. Q1 denotes the switching transistor connected to the input power supply via the primary winding Lp of the high-voltage transformer T. A starting resistor R1 is connected to the base of the switching transistor Q1. A current limiting resistor R2, a speed-up capacitor C2, and a diode D2 are disposed between the feedback winding Lf and the base of the switching transistor Q1. The control transistor Q2 is connected between the base and the emitter of the switching transistor Q1. The feedback winding Lf is connected to a time constant circuit 4 so that a voltage generated by the time constant circuit 4 is applied to the base of the control transistor Q2. Reference numeral 3 denotes an external voltage source for varying the charging time of the time constant circuit 4 via an electronic switch 5. The electronic switch 5 is turned on by a positive feedback signal generated by the feedback winding Lf. The second winding Ls of the high-voltage transformer T is connected to a rectifying and smoothing circuit 2 comprising a rectifying diode D1 and a smoothing capacitor C1. A resistance voltage divider comprising resistors R3 and R4 is connected to the output side of the rectifying and smoothing circuit. Depending on the detected value of the output voltage of the resistance voltage divider, the external voltage source 3 controls the charging time of the time constant circuit 4.

Figure 2:
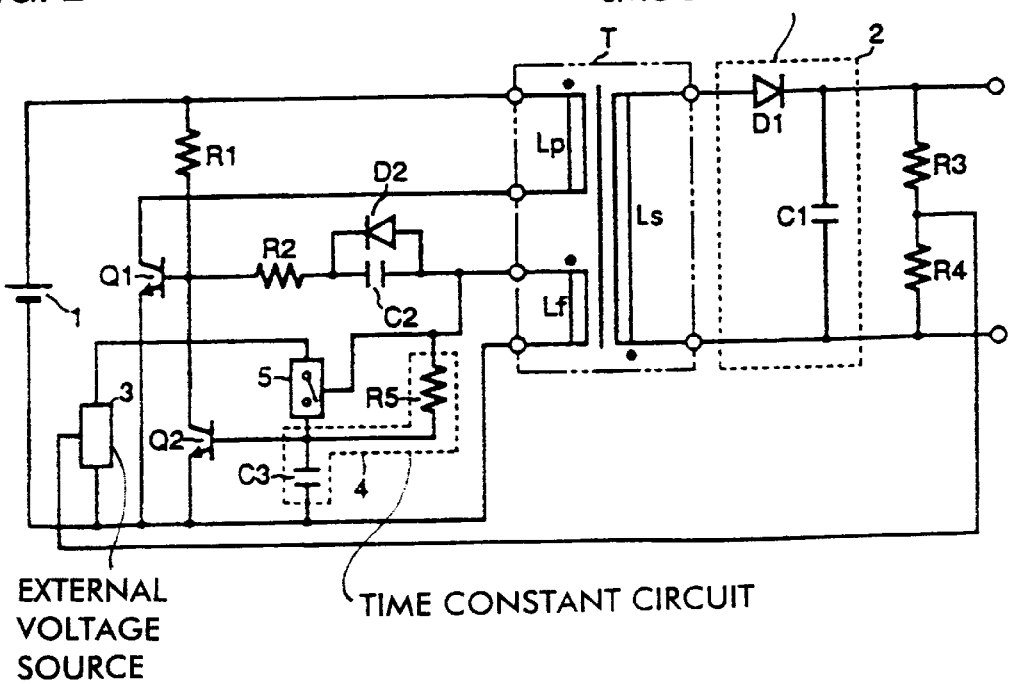
FIG. 2 is a circuit diagram illustrating another general example of a circuit configuration of a self-oscillation switching power supply according to the first embodiment.

FIG. 2 is a circuit diagram illustrating another general example of a circuit configuration of the self-oscillation switching power supply according to the first embodiment. In FIG. 2, the time constant circuit 4 includes a resistor R5 and a capacitor C3 wherein the voltage across the capacitor C3 is applied to the base of the control transistor Q2.

Figure 3:
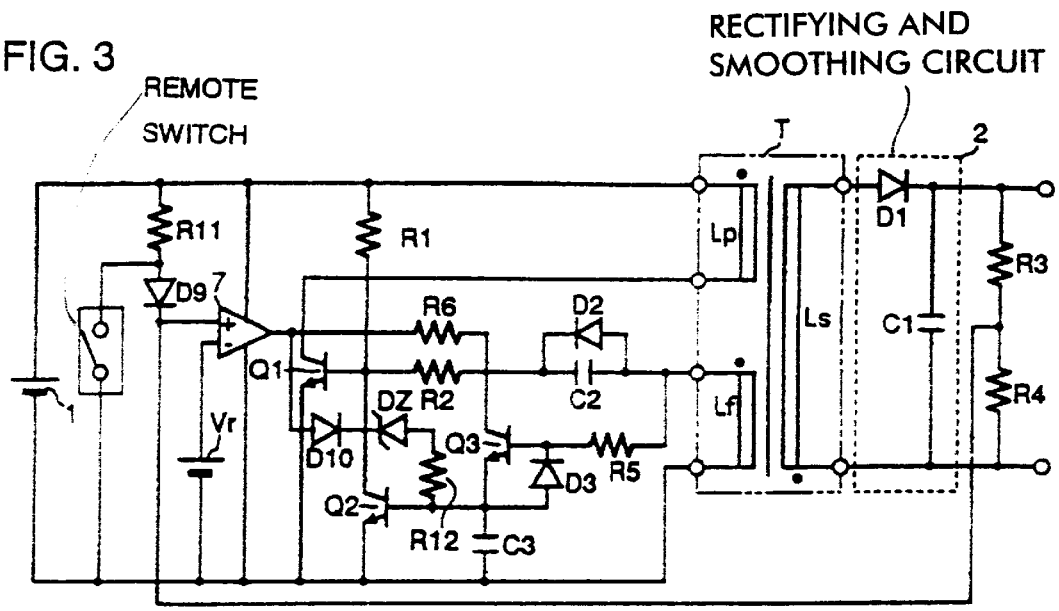
FIG. 3 is a circuit diagram illustrating a specific example of a self-oscillation switching power supply according to the first embodiment.

FIG. 3 is a circuit diagram of a specific example of a self-oscillation switching power supply according to the first embodiment. In FIG. 3, there is provided a transistor Q3 which corresponds to the electronic switch 5 shown in FIG. 1 or 2 and which turns on in response to the positive feedback voltage of a feedback winding Lf. A diode D3 serves to form a path through which a capacitor C3 is charged (discharged). Furthermore, in FIG. 3, there is provided an error amplifier 7 which corresponds to the external voltage source 3 shown in FIG. 1 or 2. This error amplifier 7 employs a reference voltage supplied by a reference voltage source Vr, and a voltage obtained by dividing the output voltage via resistors R3 and R4 is applied to an input of the error amplifier. The error amplifier amplifies the difference between the input voltage and the reference voltage by a predetermined amplification factor. The resultant voltage signal is applied to the collector of the transistor Q3 via a resistor R6. The non-inverting input terminal of the error amplifier 7 is pulled up via a resistor R22 and a diode D9. A remote switch is disposed between ground and the node between R11 and D9. A series circuit comprising a diode D10, a Zener diode DZ, and a resistor R12 is connected between the output of the error amplifier 7 and the base of a control transistor Q2.

The circuit shown in FIG. 3 operates as follows. If a DC voltage is applied from an input power supply 1, a small starting current flows into the base of a switching transistor Q1 via a starting resistor R1. As a result, a current flows through the collector of Q1. This causes a reduction in the collector-emitter voltage and thus a voltage is applied between the terminals of the primary winding Lp of a high-voltage transformer T. In proportion to this voltage, a voltage is induced across the feedback winding Lf. The induced voltage causes a positive feedback current to be supplied to the base of the switching transistor Q1 via a current limiting resistor R2, a speed-up capacitor C2, and a diode D2. As a result, the transistor Q1 is turned on (into a saturated state). In response to the transition of Q1 into the on-state, a DC voltage is applied between the terminals of the primary winding Lp of the high-voltage transformer T and a current flows through the primary winding Lp. As a result, the high-voltage transformer is excited. At the same time, a voltage is induced across the feedback winding Lf whereby the capacitance C3 is charged via the resistor R5 and the base-emitter path of the transistor Q3. Furthermore, depending on the output voltage of the error amplifier 7, a charging current flows into the capacitor C3 via a resistor R6 and the collector-emitter path of the transistor Q3. When the charging voltage across the capacitor C3 reaches a threshold value (about 0.6 V) of the base-emitter voltage of the control transistor Q2, the base and the emitter of the switching transistor Q1 are short-circuited by Q2 and thus the base current of the switching transistor Q1 is cut off. As a result, Q1 quickly turns off. When the switching transistor Q1 turns off, the base of the switching transistor Q1 is reverse-biased to a negative voltage by the induced voltage of the feedback winding Lf. At the same time, the capacitor C3 is forced to be discharged (reversely charged) by the feedback winding Lf via the diode D3 and the resistor R5. As a result, the base of the control transistor Q2 is reverse-biased to a negative voltage. Thus, the transistor Q2 is maintained in the off-state. During the time period in which the switching transistor Q1 is in the off-state, the high-voltage transformer T freely oscillates at a resonance frequency. As a result, a voltage is induced across the feedback winding whereby the base of the switching transistor Q1 is forward-biased. Thus, the switching transistor Q1 again turns on. The above-described turning on and off occurs periodically and the oscillatory operation grows into a continuous oscillation.

If an increase occurs in the output voltage, the voltage at the non-inverting terminal of the error amplifier 7 increases and a corresponding increase occurs in the collector voltage of the transistor Q3. This results in an increase in the charging current flowing into the capacitor C3 via the resistor R6 and the collector-emitter path of the transistor Q3. Thus, the increase in the output voltage results in an increase in the increasing rate at which the voltage across the capacitor C3 increases, and thus the capacitor C3 is charged in a shorter charging time. As a result, the on-period of the switching transistor Q1 becomes shorter. That is, if the switching transistor Q1 turns off and a positive feedback signal is generated across the feedback winding Lf, then the control transistor Q2 turns on and the switching transistor Q1 turns off in a short time. The turning-off of the switching transistor Q1 causes a negative voltage to be induced across the feedback winding Lf and thus the capacitor C3 is discharged (reversely charged) via the diode D5, the resistor R5, and the feedback winding Lf. Conversely, if a reduction occurs in the output voltage, the process occurs in an opposite fashion. That is, the charging time becomes longer and thus the on-period of the switching transistor Q1 becomes longer. In this circuit, as described above, the charging time associated with the time constant circuit including the resistor R5, the transistor Q3, and the capacitor C3 is controlled depending on the output voltage of the error amplifier 7 serving as the external voltage source so that even when the on-period of the switching transistor Q1 becomes short due to a reduction in the load current, a sufficient amount of positive feedback current is supplied into the base of the switching transistor Q1 from the feedback winding Lf during the period in which the capacitance is charged, without causing the feedback winding Lf to be short-circuited by the transistor Q3. This prevents the control transistor Q2 from turning on earlier than the transistor Q1, and thus it becomes possible that the switching transistor Q1 can operate in a stable fashion over a wide operating region from the saturation region to the unsaturated region without encountering an intermittent operation.

Furthermore, in FIG. 3, if the remote switch is turned off, the non-inverting terminal of the error amplifier 7 is pulled up to a high level and thus the output voltage of the error amplifier 7 is maintained at a maximum value. As a result, the Zener diode DZ turns on and thus the control transistor Q2 turns on. As a result, the switching transistor Q1 turns off and it is maintained in the off-state. If the remote switch is turned on, then the diode D9 is turned off and thus the non-inverting terminal of the error amplifier 7 is released from the pulled-up state. As a result, the voltage applied to the non-inverting terminal of the error amplifier 7 becomes equal to the voltage provided by the voltage dividing resistors R3 and R4. The output voltage of the error amplifier 7 decreases from the maximum value toward a particular control voltage. As a result, the switching transistor Q1 starts to operate from a state in which the on-period has a minimum value, and the on-period quickly increases to the normal on-period value. Thus, the output voltage quickly rises up without generating overshoot. This technique makes it possible to quickly start the switching power supply circuit using an inexpensive remote control circuit without producing overshoot.

Figure 4:
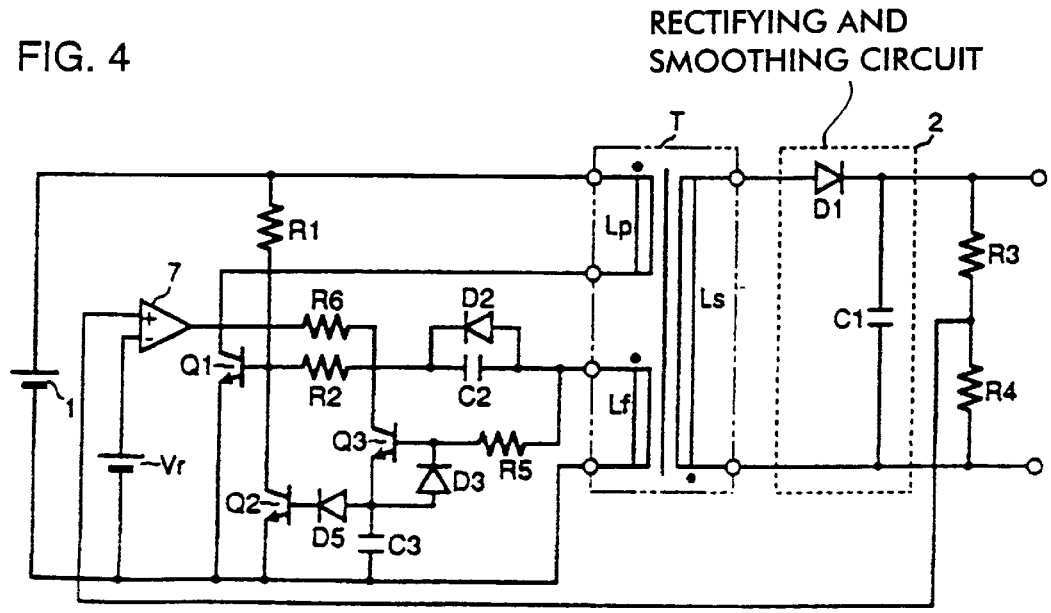
FIG. 4 is a circuit diagram illustrating an example of a self-oscillation switching power supply according to a second embodiment.

FIG. 4 is a circuit diagram illustrating a second embodiment of a self-oscillation switching power supply. The difference from the circuit shown in FIG. 3 is that there is provided an additional diode D5 between the capacitor C3 of the time constant circuit and the base of the control transistor Q2. Although not shown in FIG. 4, the switching power supply also includes a remote control circuit. The diode D5 additionally disposed in the circuit serves to cut off a reverse bias current which would otherwise flow into the control transistor Q2 from the feedback winding Lf when the switching transistor Q1 turns off. As a result, high-frequency response is prevented by the carrier accumulation effect in the control transistor Q2. This limits the maximum oscillation frequency of the switching transistor Q1. As a result, the high-frequency oscillation at the series resonance frequency associated with the circuit formed by the leakage inductance and the distributed capacitance of the high-voltage transformer is suppressed. Therefore, an unstable operation such as an intermittent operation is prevented and it becomes possible to vary the output voltage (current) over a wide range without encountering instability.

Figure 5:
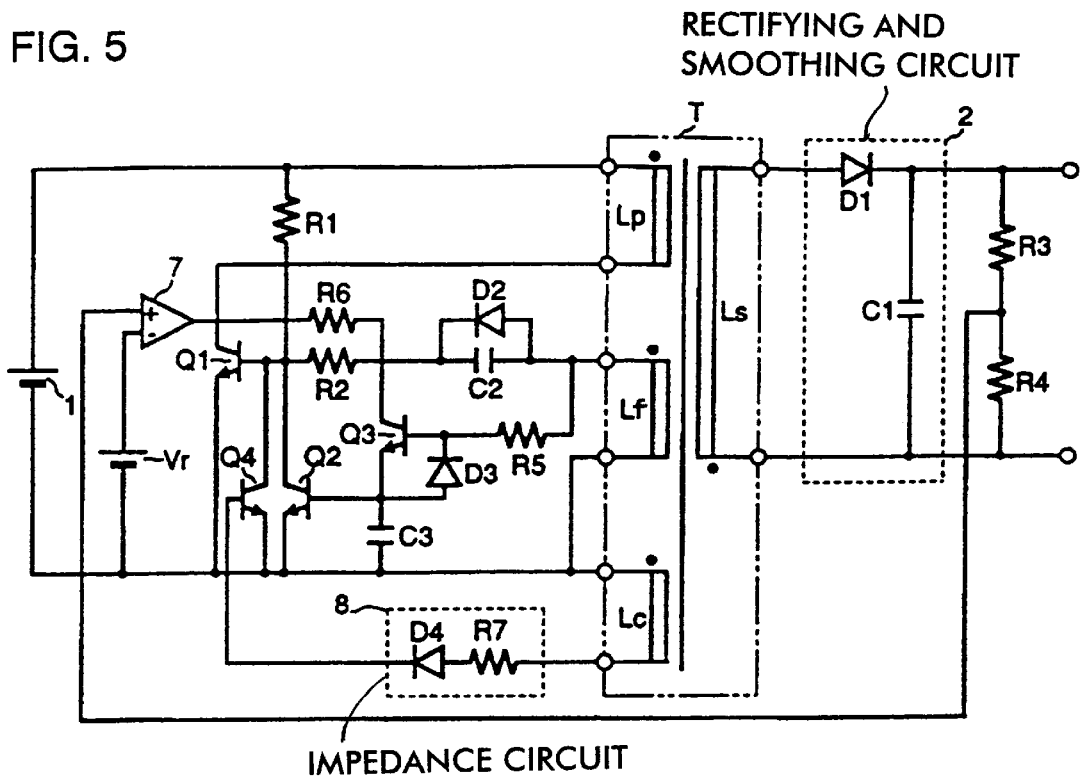
FIG. 5 is a circuit diagram illustrating an example of a self-oscillation switching power supply according to a third embodiment.

FIG. 5 is a circuit diagram illustrating a third embodiment of a self-oscillation switching power supply. The difference from the circuit shown in FIG. 3 is that there is provided a delay transistor Q4 between the base and the emitter of the switching transistor Q1 and there are also provided a control winding Lc and an impedance circuit 8 so that a control signal is generated by the control winding Lc and applied to the delay transistor Q4 via the impedance circuit 8. The polarity of the voltage induced across the control winding Lc is opposite to that of the feedback winding Lf. More specifically, a positive voltage is induced during the off-period of the switching transistor Q1 whereby the delay transistor Q4 is forward-biased between its base and emitter, via the impedance circuit including the current limiting resistor R7 and the diode D4. After that, a voltage is induced across the feedback winding by the resonant oscillation of the high-voltage transformer T whereby the base of the switching transistor Q1 is forward-biased. In response to the forward bias voltage, the switching transistor Q1 attempts to turn on. However, the diode D4 prevents the carriers accumulated in the delay transistor Q4 from being swept out, and thus the delay transistor Q4 is maintained in the on-state for a short time. As a result, the switching transistor Q1 turns on after a short delay. Therefore, an unstable operation such as an intermittent operation is prevented and it becomes possible to vary the output voltage (current) over a wide range without encountering instability.

Figure 6:
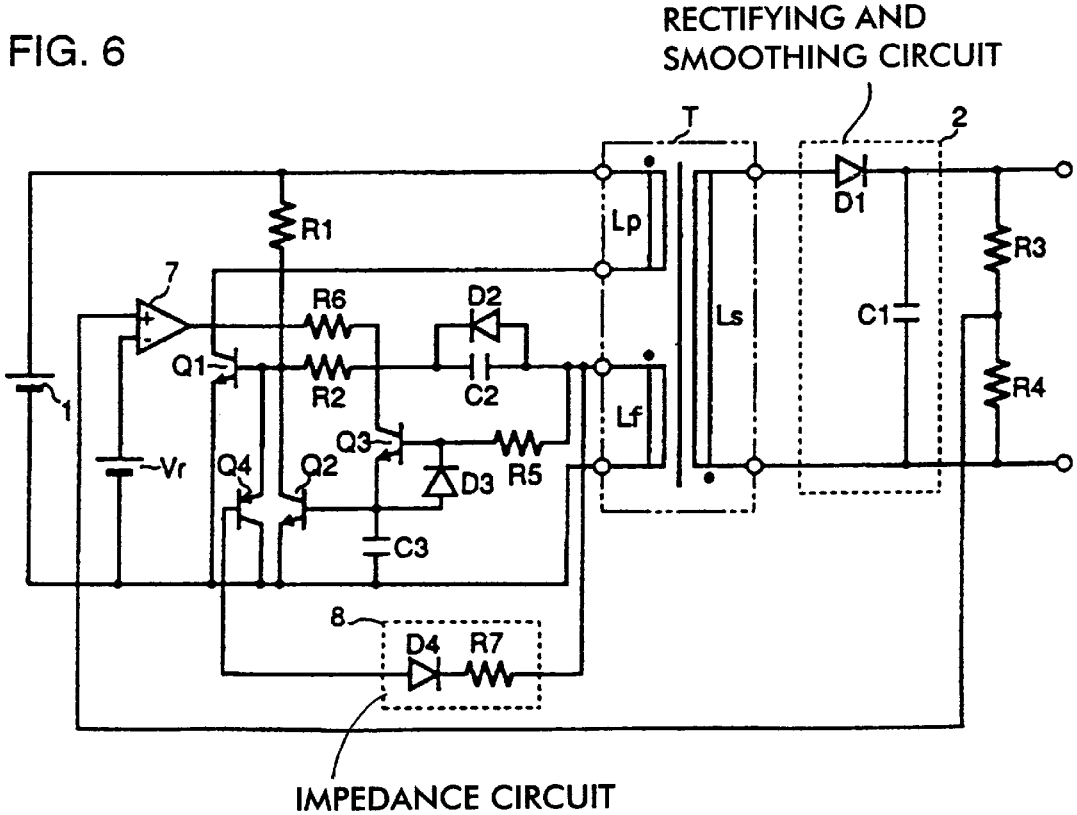
FIG. 6 is a circuit diagram illustrating an example of a self-oscillation switching power supply according to a fourth embodiment.

FIG. 6 illustrates a fourth embodiment of a self-oscillation switching power supply. In this fourth embodiment, unlike the embodiment described above with reference to FIG. 5, a PNP transistor is employed as the delay transistor Q4 and the diode D4 of the impedance circuit 8 is disposed in an opposite direction thereby achieving similar effects without using the control winding. In this circuit, as in the circuit shown in FIG. 5, when the switching transistor Q1 is going to turn on, the diode D4 prevents the carriers accumulated in the delay transistor Q4 from being swept out, and thus the delay transistor Q4 is maintained in the on-state for a short time. As a result, the switching transistor Q1 turns on after a short delay. Therefore, an unstable operation such as an intermittent operation is prevented and it becomes possible to vary the output voltage (current) over a wide range without encountering instability.

Figure 7:
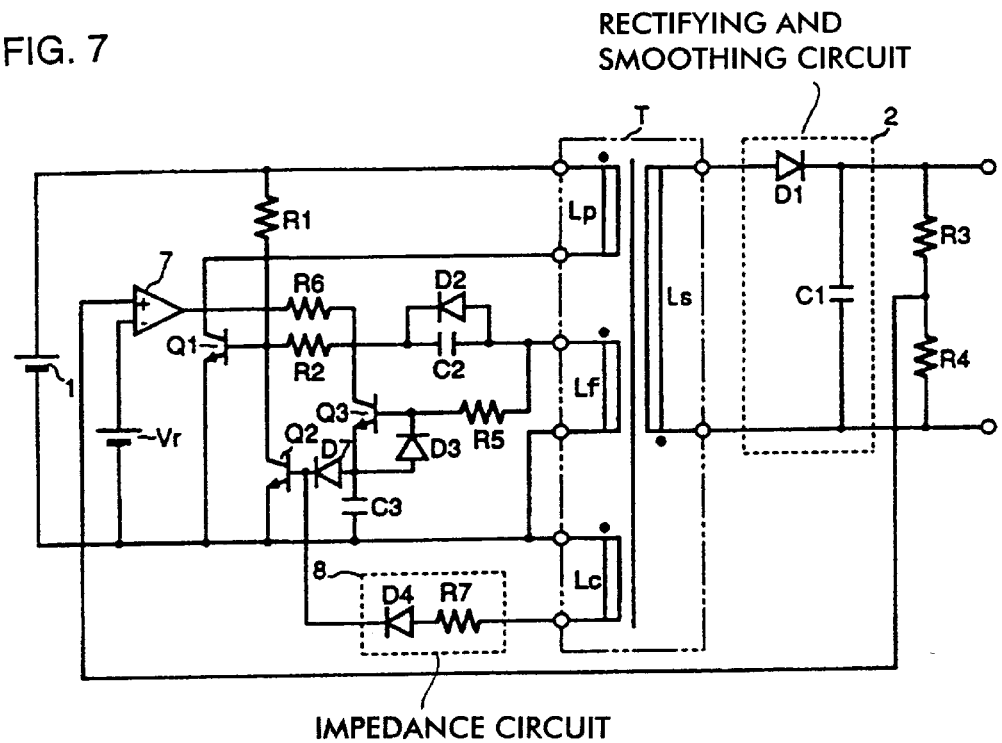
FIG. 7 is a circuit diagram illustrating an example of a self-oscillation switching power supply according to a fifth embodiment.

FIG. 7 is a circuit diagram illustrating a * fifth embodiment of a self-oscillation switching power supply. In this fifth embodiment, unlike the embodiment described above with reference to FIG. 5, similar effects are achieved without using the delay transistor Q4 shown in FIG. 5. In FIG. 7, an impedance circuit 8 is connected between a control winding Lc and the base of a control transistor Q2. Furthermore, a reverse current cutting-off diode D7 is disposed between a time constant circuit 4 and the base of the transistor Q2. In this circuit configuration, the control transistor Q2 also plays a role which is played by the delay transistor Q4 in the circuit shown in FIG. 5.

Figure 8:
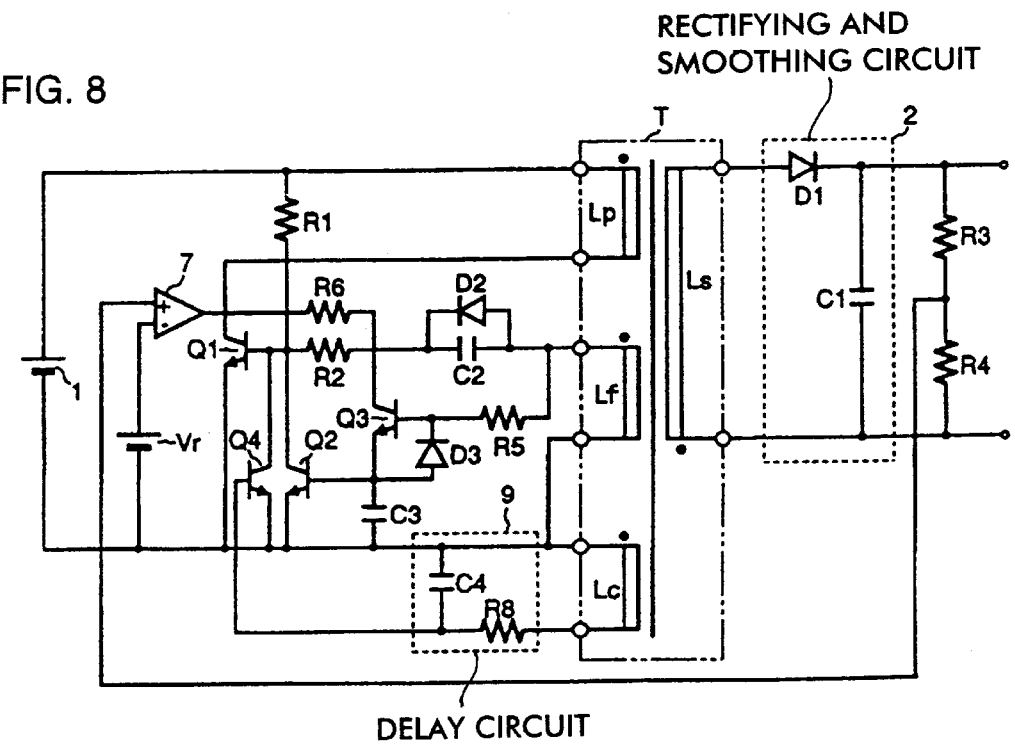
FIG. 8 is a circuit diagram illustrating an example of a self-oscillation switching power supply according to a sixth embodiment.
Figure 9:
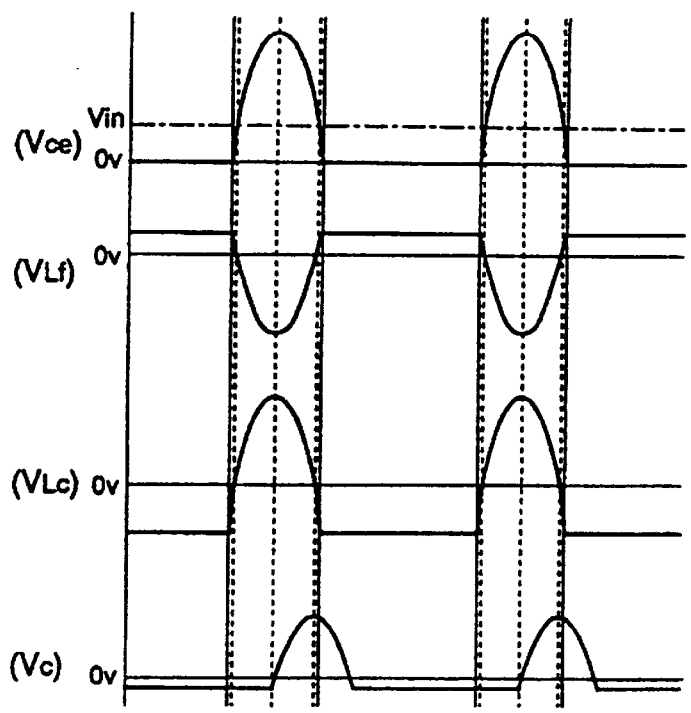
FIG. 9 is a diagram illustrating the voltage waveforms for various points in the circuit of FIG. 8.

Referring now to FIGS. 8 and 9, a sixth embodiment of a self-oscillation switching power supply is described below.

This sixth embodiment is different from that shown in FIG. 5 in the circuit configuration of the part between the control winding Lc and the delay transistor Q4. In this sixth embodiment, a delay circuit 9 is realized using an integrating circuit including a resistor R8 and a capacitor C4. In FIG. 8, the control winding Lc is formed to have a polarity so that the delay transistor Q4 is reverse-biased during the on-period of the switching transistor Q1 and so that the delay transistor Q4 is forward-biased during the off-period of the switching transistor Q1. The delay circuit 9 integrates the induced voltage of the control winding Lc using the resistor R8 and the capacitor C4. As a result, the voltage across the capacitor C4 has a phase delay of about 90° relative to the induced voltage of the control winding Lc, and the waveform of the voltage across the capacitor C4 decreases in amplitude with a gain determined by the resistance of the resistor R8 and the capacitance of the capacitor C4. FIG. 9 illustrates the waveforms of the collector-emitter voltage Vce of the switching transistor Q1, the induced voltage $V_{Lf}$ of the feedback winding Lf, the induced voltage $V_{Lc}$ of the control winding Lc, and the voltage Vc across the capacitor C4. As can be seen from FIG. 9, the voltage Vc having a phase delay relative to the phase of the voltage $V_{Lf}$ induced across the feedback winding Lf is applied to the base of the delay transistor Q4. Therefore, when a positive feedback voltage, which would enhance the turning-on of the switching transistor Q1, is induced across the feedback winding Lf, the base and the emitter of the switching transistor Q1 are further short-circuited by the delay transistor Q4 until the voltage across the capacitor C4 decreases to a value lower than the threshold voltage (about 0.6 V) of the delay transistor Q4. Thus, when the switching transistor Q1 turns on, a positive feedback current is supplied after Vc has become substantially equal to 0 V as a result of a resonant oscillation thereby producing a delay in the turning-on timing of the switching transistor Q1 thus suppressing an initial excess current into the collector of the switching transistor Q1. As a result, a great reduction in the switching loss is achieved. Furthermore, the amplitude of the ringing component superimposed on the collector current of Q1 during the on-period of transistor Q1 is suppressed and thus the on-period of the switching transistor is properly controlled depending on the output voltage detected.

Figure 10:
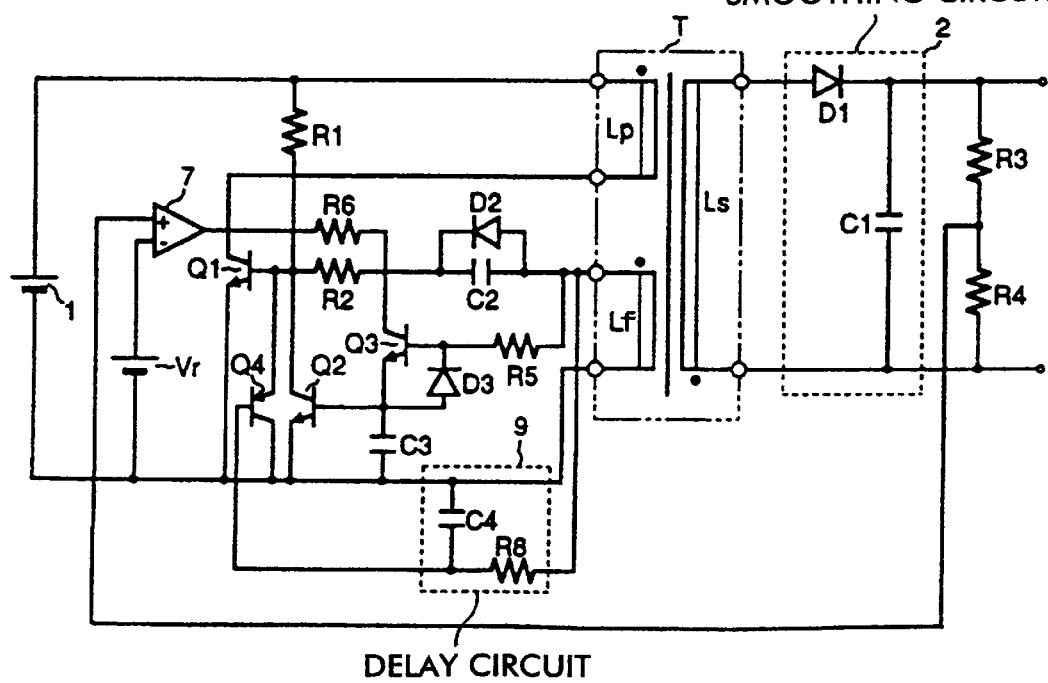
FIG. 10 is a circuit diagram illustrating an example of a self-oscillation switching power supply according to a seventh embodiment.

FIG. 10 is a circuit diagram illustrating a seventh embodiment of a self-oscillation switching power supply. This circuit is different from that shown in FIG. 8 in that a PNP transistor is employed as the delay transistor Q4 and similar effects are achieved without using the control winding. In FIG. 10, a capacitor C4 is charged so that the delay transistor Q4 is reverse-biased during the on-period of the switching transistor Q1 and so that the delay transistor Q4 is forward-biased during the off-period of the switching transistor Q1 thereby producing a delay in the turning-on timing of the switching transistor Q1 thus suppressing an initial excess current into the collector of the switching transistor Q1. As a result, a great reduction in the switching loss is achieved. Furthermore, the amplitude of the ringing component superimposed on the collector current of Q1 during the on-period of Q1 is suppressed and thus the on-period of the switching transistor is properly controlled depending on the output voltage detected.

Figure 11:
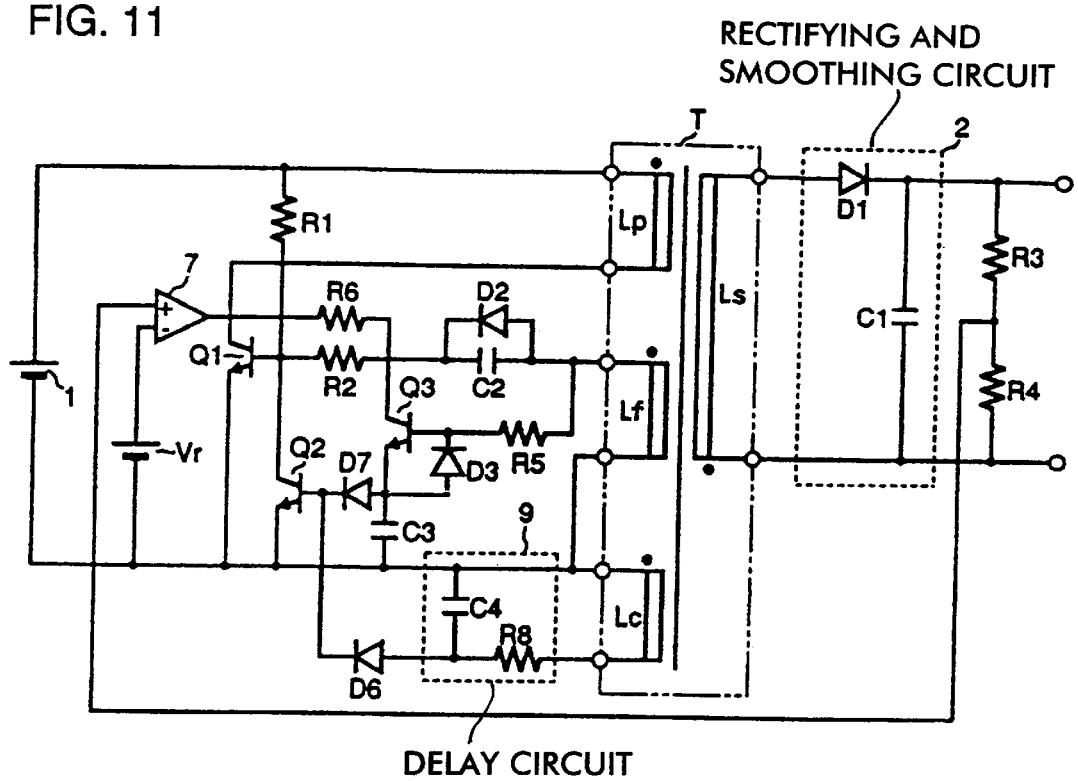
FIG. 11 is a circuit diagram illustrating an example of a self-oscillation switching power supply according to an eighth embodiment.

FIG. 11 is a circuit diagram illustrating an eighth embodiment of a self-oscillation switching power supply. This circuit is different from that shown in FIG. 8 in that similar effects are achieved without using the delay transistor Q4 shown in FIG. 8. In FIG. 11, the output of a delay circuit 9 realized by an integrating circuit is connected to the base of a control transistor Q2 via a reverse current cutting-off diode D6. Furthermore, a reverse current cutting-off diode D7 is disposed between a time constant circuit and the base of the transistor Q2. In this circuit configuration, the control transistor Q2 also plays a role which is played by the delay transistor Q4 in the circuit shown in FIG. 8.

Figure 12:
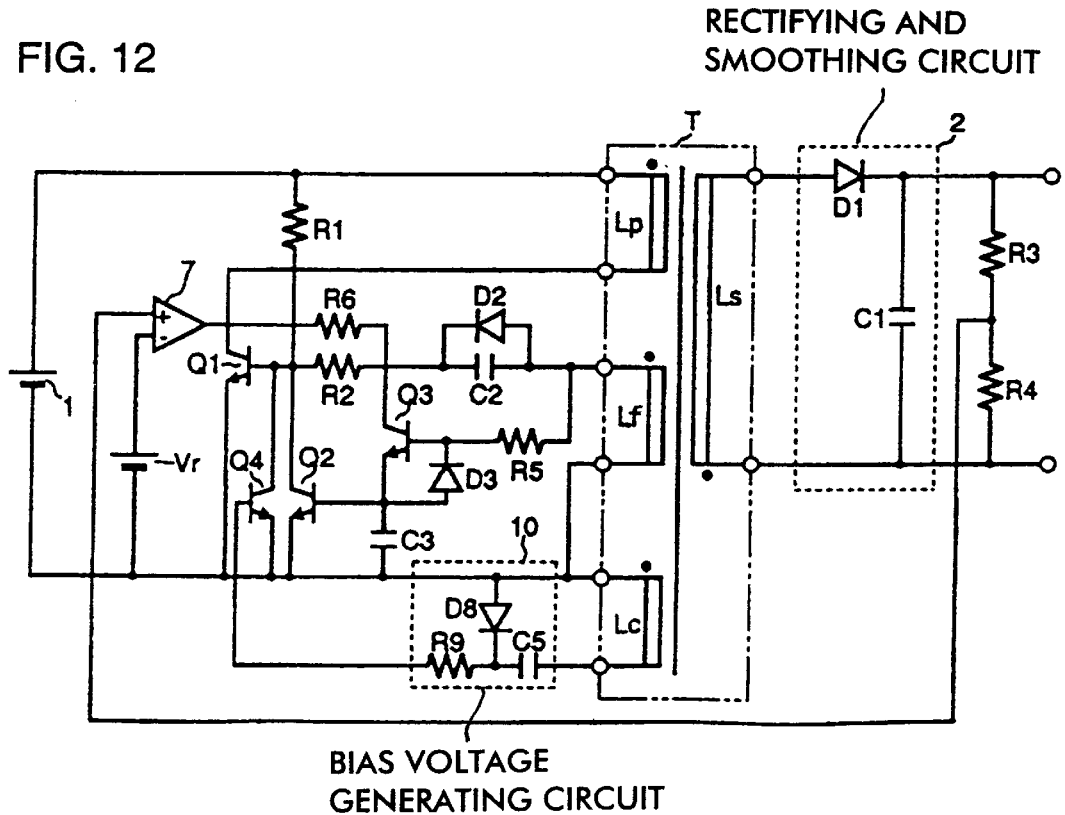
FIG. 12 is a circuit diagram illustrating an example of a self-oscillation switching power supply according to a ninth embodiment.
Figure 13:
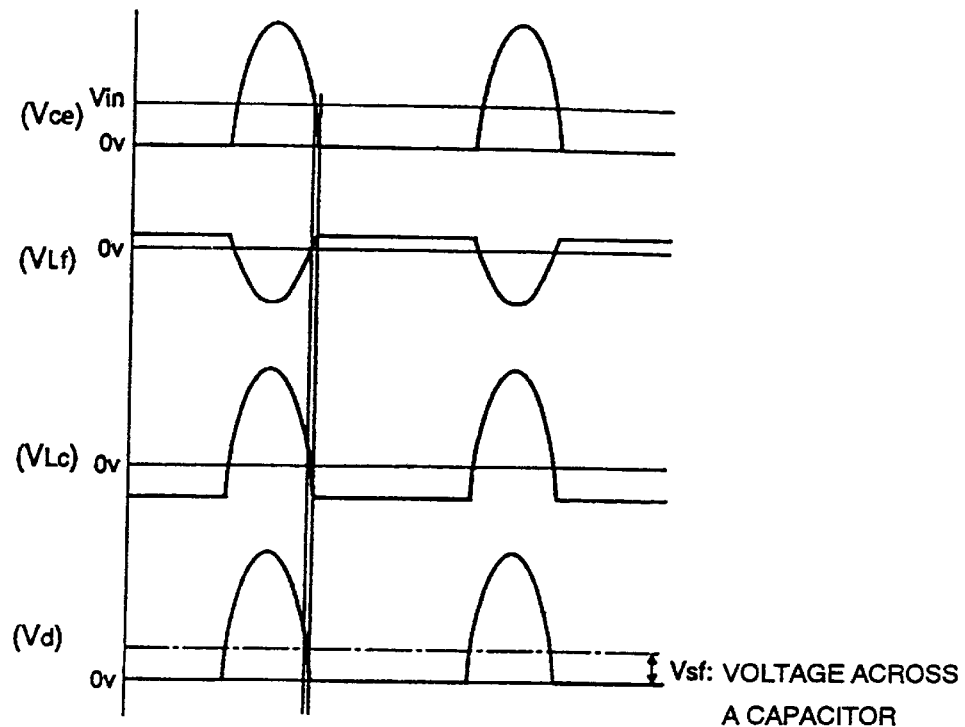
FIG. 13 is a diagram illustrating the voltage waveforms for various points in the circuit of FIG. 12.

Referring now to FIGS. 12 and 13, a ninth embodiment of a self-oscillation switching power supply is described below.

FIG. 12 is a circuit diagram of this power supply. This circuit is different from that shown in FIG. 8 in the circuit configuration of the part between the control winding Lc and the delay transistor Q4. In FIG. 12, a bias voltage generating circuit 10 is formed using a capacitor C5, a diode D8, and a resistor R9. FIG. 13 illustrates the waveforms of the collector-emitter voltage Vce of the switching transistor Q1, the induced voltage $V_{Lf}$ of the feedback winding Lf, the induced voltage $V_{Lc}$ of the control winding Lc, and the cathode voltage Vd of the diode D8. The sum of the induced voltage $V_{Lc}$ of the control winding and the voltage (Vsf) across the capacitor C5 is applied to the base of the delay transistor Q4, as represented by Vd in FIG. 13. Therefore, when a positive feedback voltage, which would enhance the turning-on of the switching transistor Q1, is induced across the feedback winding Lf, the base and the emitter of the switching transistor Q1 are further short-circuited by the delay transistor Q4 until the voltage across the capacitor C4 decreases to a value lower than the threshold voltage (about 0.6 V) of the delay transistor Q4. Therefore, when the switching transistor Q1 turns on, a positive feedback current is supplied after Vc has become substantially equal to 0 V as a result of a resonant oscillation thereby producing a short delay in the turning-on timing of the switching transistor Q1 thus suppressing an initial excess current into the collector of the switching transistor Q1. As a result, a great reduction in the switching loss is achieved. Furthermore, the amplitude of the ringing component superimposed on the collector current of transistor Q1 during the on-period of transistor Q1 is suppressed and thus the on-period of the switching transistor is properly controlled depending on the output voltage detected.

Figure 14:
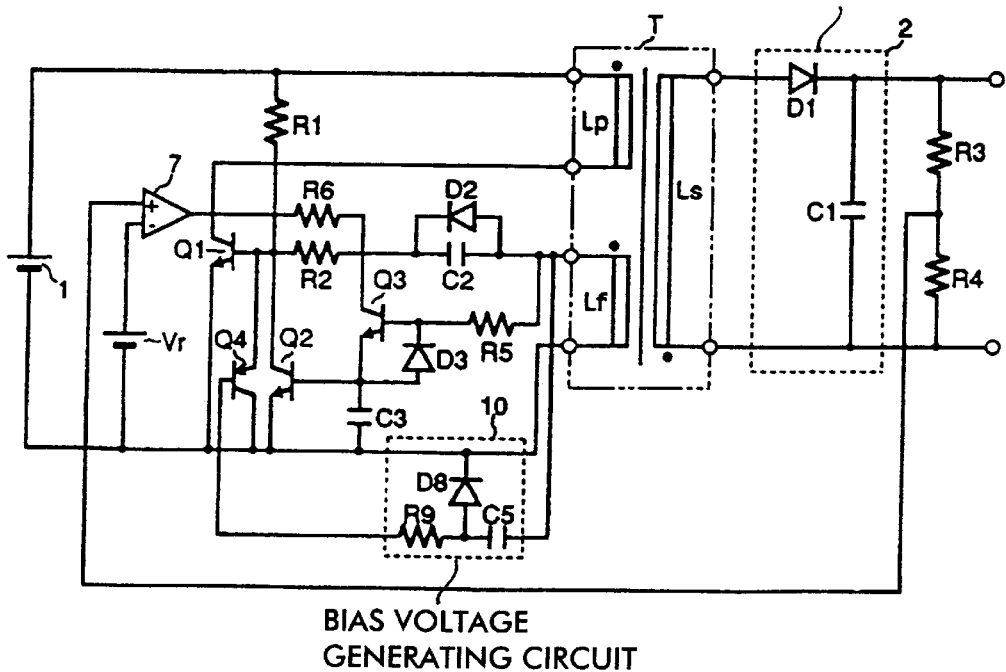
FIG. 14 is a circuit diagram illustrating an example of a self-oscillation switching power supply according to a tenth embodiment.

FIG. 14 is a circuit diagram illustrating a tenth embodiment of a self-oscillation switching power supply. In this tenth embodiment, unlike the embodiment described above with reference to FIG. 12, a PNP transistor is employed as the delay transistor Q4 and the diode D8 of the bias voltage generating circuit 10 is disposed in an opposite direction thereby achieving similar effects without using the control winding. As can be seen from FIG. 14, the polarity of the bias voltage generated by the bias voltage generating circuit is opposite to that shown in FIG. 12. In this circuit configuration, as in the circuit shown on FIG. 12, a short delay is produced in the turning-on timing of the switching transistor Q1 thereby suppressing an initial excess current into the collector of the switching transistor Q1. As a result, a great reduction in the switching loss is achieved. Furthermore, the amplitude of the ringing component superimposed on the collector current of transistor Q1 during the on-period of transistor Q1 is suppressed and thus the on-period of the switching transistor is properly controlled depending on the output voltage detected.

Figure 15:
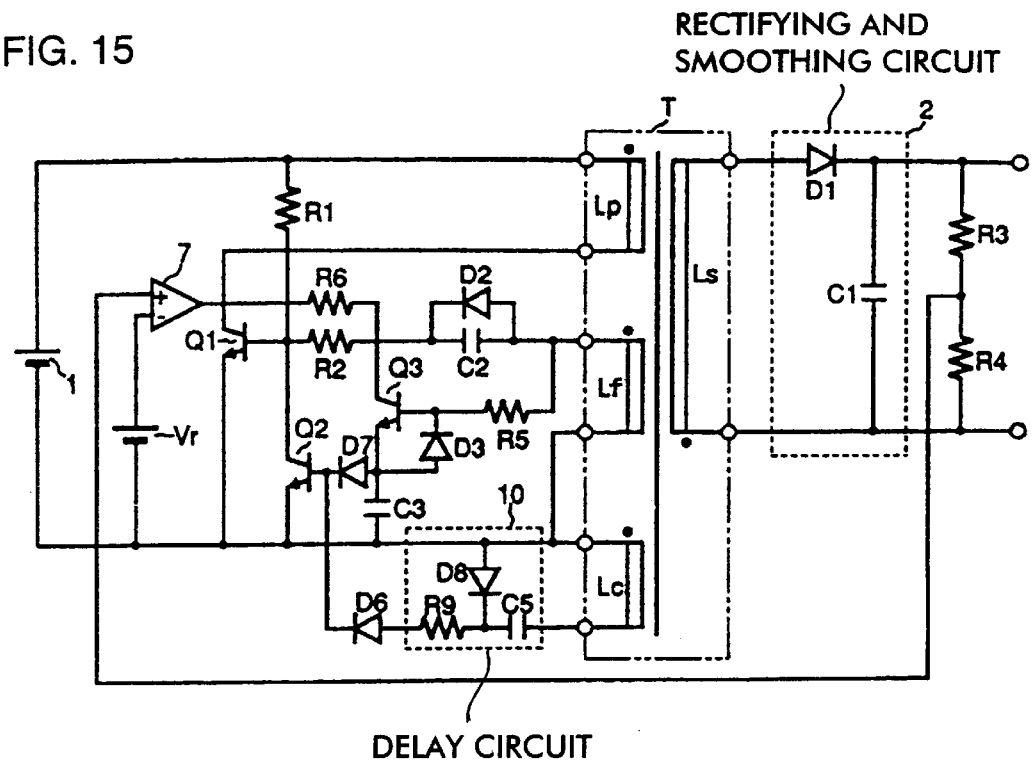
FIG. 15 is a circuit diagram illustrating an example of a self-oscillation switching power supply according to an eleventh embodiment.
Figure 16:
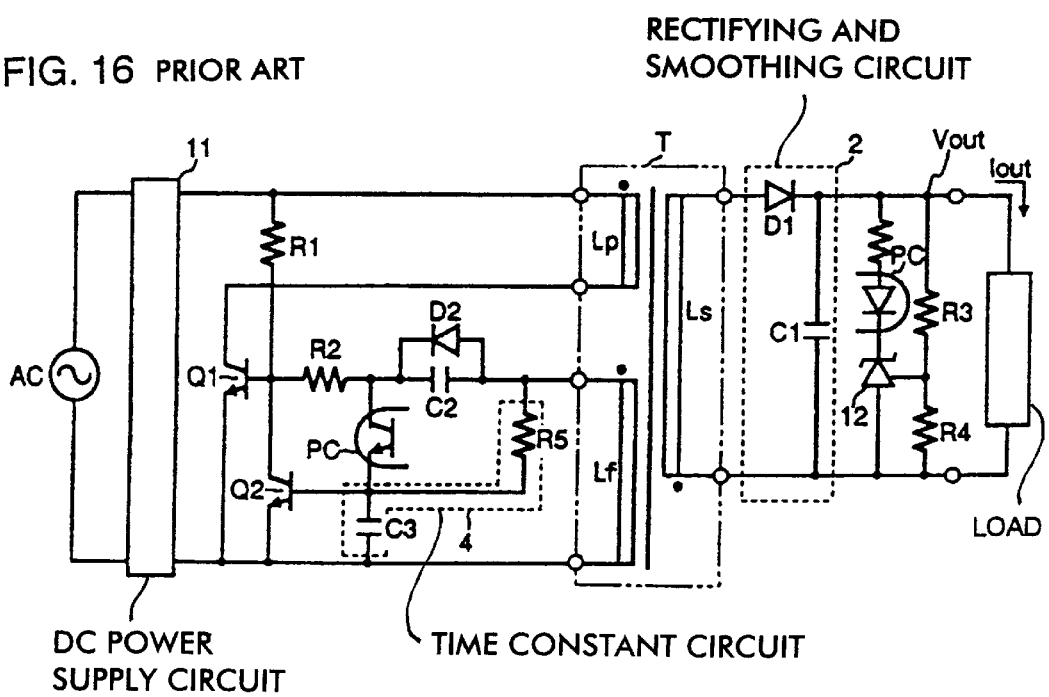
FIG. 16 is a circuit diagram illustrating a conventional self-oscillation switching power supply.
Figure 19:
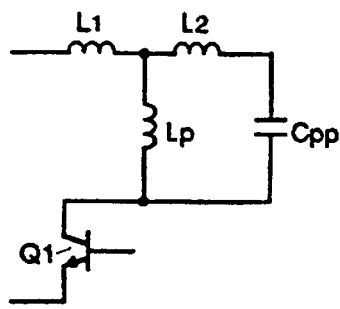
FIG. 19 illustrates an equivalent circuit of a transformer and a switching transistor.
Figure 20A:
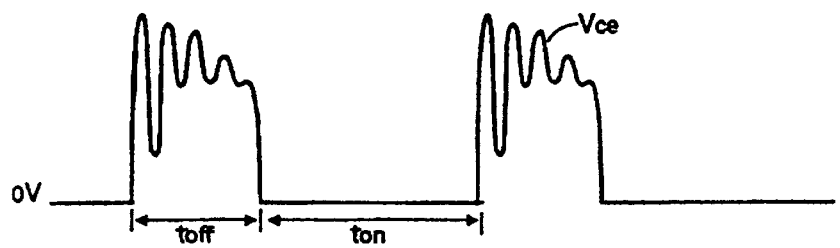
Figure 20B:
Figure 20C:
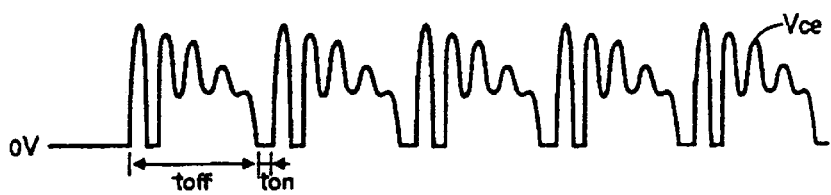
Figure 22A:
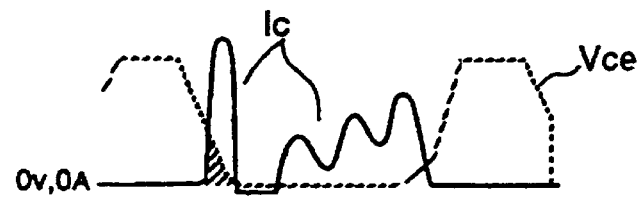
FIGS. 22A and 22B are diagrams illustrating the voltage and current waveforms for various points in FIG. 19.
Figure 22B:
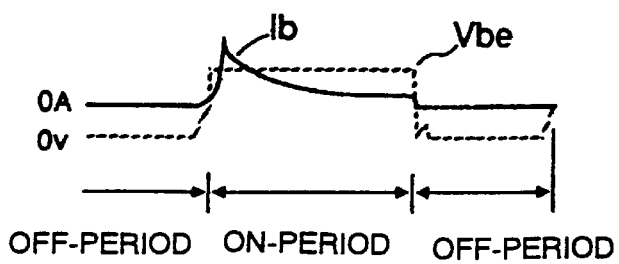
Figure 23:
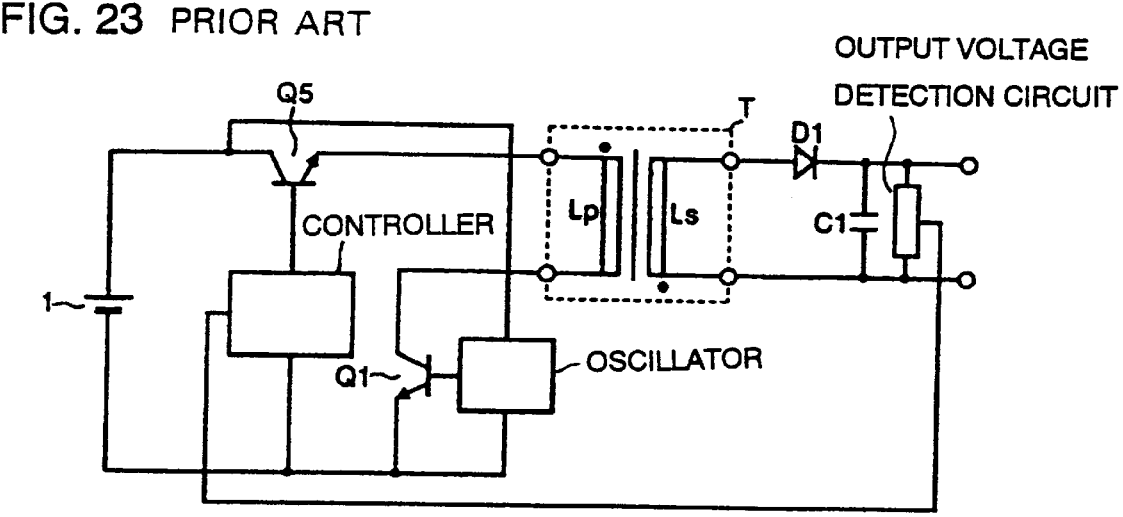
FIG. 23 is a diagram illustrating a conventional high-voltage switching power supply.

FIG. 15 is a circuit diagram illustrating an eleventh embodiment of a self-oscillation switching power supply. In this eleventh embodiment, unlike the embodiment described above with reference to FIG. 12, similar effects are achieved without using the delay transistor Q4. In FIG. 15, the output of a bias voltage generating circuit 10 is connected to the base of a control transistor Q2 via a reverse current cutting-off diode D6. Furthermore, a reverse current cutting-off diode D7 is disposed between the time constant circuit and the base of the transistor Q2. In this circuit configuration, the control transistor Q2 also plays a role which is played by the delay transistor Q4 in the circuit shown in FIG. 12.

In the embodiments described above, the discrete transistor Q3 serving as the electronic switch may be replaced with the phototransistor of a photocoupler. For example, in FIG. 3, Q3 may be replaced with the phototransistor of a photocoupler, the anode of the light emitting diode of the photocoupler may be connected to the node between the resistor R5 and the diode D3, and the cathode of the light emitting diode may be connected to either terminal of the capacitor C3.

In the embodiments described above, a capacitor may be connected in parallel to the resistor R5 of the time constant circuit so that the transistor Q3 can be driven even when the positive feedback voltage signal from the feedback winding Lf has high-frequency components. This allows a further expansion of the range over which the output can be controlled.

Furthermore, in the embodiments described above, if the resistor R6 disposed in the charging path extending from the error amplifier 7 is replaced with a series circuit of a resistor and a Zener diode, then the series circuit behaves as a variable impedance element in the range close to the Zener voltage whereby, when the charging time is set to be long, the charging current caused by the output of the error amplifier can be suppressed to an infinitely low level. This allows a further expansion of the range over which the output can be controlled.

Furthermore, the delay transistor Q4 in the discrete form shown in various figures may be replaced with the phototransistor of a photocoupler. For example, in FIG. 5, Q4 may be replaced with the phototransistor of a photocoupler, the anode of the light emitting diode of the photocoupler may be connected to the output of the impedance circuit, and the cathode of the light emitting diode may be connected to the emitter of the phototransistor.

Furthermore, the transistors of the bipolar type employed in the embodiments described above may be replaced with transistors of the unipolar type.

Although, in the embodiments described above, the time constant circuit for outputting a control signal to the control transistor Q2 is connected to the feedback winding, similar operations and advantages can also be achieved by connecting the time constant circuit to a control winding which is additionally provided so that the control winding has the same polarity as that of the feedback winding.

Furthermore, similar operations and advantages can also be achieved by connecting the time constant circuit to a control winding which is additionally provided so that the control winding has an opposite polarity to that of the feedback winding and replacing the control transistor Q2 with a PNP transistor.

Although, in the embodiments described above, the power supply circuit is designed to output a constant voltage, the present invention may also be applied to a power supply circuit in which the output current is detected and the feedback control is performed so as to output a constant current.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-oscillation switching power supply comprising: a transformer including a primary winding, a secondary winding and at least one control winding, a switching transistor for turning on and off the current flowing in said primary winding; a control transistor for controlling a feedback signal from said at least one control winding to said switching transistor; and a time constant circuit having a charging time which is charged by a voltage generated across said at least one control winding and which supplies a control voltage to said control transistor, and further comprising an electronic switch which is opened and closed in response to the feedback signal from said at least one control winding wherein an external voltage source is connected to said time constant circuit by said electronic switch so that the charging time of said time constant circuit is varied according to an output voltage detection signal dependent on an output voltage of the power supply.

2. A self-oscillation switching power supply according to claim 1, wherein said time constant circuit includes a series circuit of a resistor and a capacitor and the voltage across the charged capacitor is output as the control voltage supplied to said control transistor and wherein said electronic switch is disposed between said external voltage source and said capacitor.

3. A self-oscillation switching power supply according to claim 2, wherein said electronic switch comprises a transistor which is turned on by the feedback voltage of said at least one control winding and wherein there is provided a diode for discharging the charge of said capacitor into said at least one control winding when said transistor turns off.

4. A self-oscillation switching power supply according to claim 1, wherein there is provided an impedance circuit between said time constant circuit and a control voltage input part of said control transistor so that said impedance circuit prevents said control transistor from being reverse-biased by said at least one control winding.

5. A self-oscillation switching power supply according to claim 2, wherein there is provided an impedance circuit between said time constant circuit and a control voltage input part of said control transistor so that said impedance circuit prevents said control transistor from being reverse-biased by said at least one control winding.

6. A self-oscillation switching power supply comprising: a transformer including a primary winding, a secondary winding and at least one control winding, a switching transistor for turning on and off the current flowing in said primary winding; a control transistor for controlling a feedback signal from said at least one control winding to said switching transistor; and a time constant circuit having a charging time which is charged by a voltage generated across said at least one control winding and which supplies a control voltage to said control transistor, and further comprising an electronic switch which is opened and closed in response to the feedback signal from said at least one control winding wherein an external voltage source is connected to said time constant circuit by said electronic switch so that the charging time of said time constant circuit is varied according to an output voltage detection signal dependent on an output voltage of the power supply;

wherein said time constant circuit includes a series circuit of a resistor and a capacitor and the voltage across the charged capacitor is outout as the control voltage supplied to said control transistor and wherein said electronic switch is disposed between said external voltage source and said capacitor;

wherein said electronic switch comprises a transistor which is turned on by the feedback voltage of said at least one control winding and wherein there is provided a diode for discharging the charge of said capacitor into said at least one control winding when said transistor turns off; and further wherein there is provided an impedance circuit between said time constant circuit and a control voltage input part of said control transistor so that said impedance circuit prevents said control transistor from being reverse-biased by said at least one control winding.

7. A self-oscillation switching power supply according to any of claim 1, wherein a control signal input part of the switching transistor is connected to a delay transistor for causing said switching transistor to have a delay in its turning-on timing and wherein there is provided an impedance circuit between a control voltage input part of said delay transistor and said at least one control winding so that said impedance circuit prevents said delay transistor from being reverse-biased by said at least one control winding.

8. A self-oscillation switching power supply according to claim 1, wherein there is provided an impedance circuit between a control voltage input part of said control transistor and said at least one control winding so that said impedance circuit prevents said control transistor from being reverse-biased by said at least one control winding.

9. A self-oscillation switching power supply according to claim 1, wherein a control signal input part of the switching transistor is connected to a delay transistor for causing said switching transistor to have a delay in its turning-on timing and wherein there is provided a delay circuit for delaying the feedback signal from said at least one control winding by an amount corresponding to a fixed time constant and supplying the resultant delayed signal as a control signal to said delay transistor.

10. A self-oscillation switching power supply according to claim 1, wherein there is provided a delay circuit for delaying the feedback signal from said at least one control winding by an amount corresponding to a fixed time constant and supplying the resultant delayed signal as a control signal to said control transistor.

11. A self-oscillation switching power supply comprising: a transformer including a primary winding, a secondary winding and at least one control winding, a switching transistor for turning on and off the current flowing in said primary winding; a control transistor for controlling a feedback signal from said at least one control winding to said switching transistor; and a time constant circuit having a charging time which is charged by a voltage generated across said at least one control winding and which supplies a control voltage to said control transistor, and further comprising an electronic switch which is opened and closed in response to the feedback signal from said at least one control winding wherein an external voltage source is connected to said time constant circuit by said electronic switch so that the charging time of said time constant circuit is varied according to an output voltage detection signal dependent on an output voltage of the power supply;

wherein a control signal input part of the switching transistor is connected to a delay transistor for causing said switching transistor to have a delay in its turning-on timing and wherein there is provided a bias voltage generating circuit between a control voltage input part of said delay transistor and said at least one control winding so that said bias voltage generating circuit is charged by a voltage generated across said at least one control winding thereby providing a DC bias voltage to a control voltage applied to said delay transistor.

12. A self-oscillation switching power supply according to claim 1, wherein there is provided a bias voltage generating circuit between a control voltage input part of said control transistor and said at least one control winding so that said bias voltage generating circuit is charged by a voltage generated across said at least one control winding thereby providing a DC bias voltage to the control voltage applied to said control transistor.

13. A self-oscillation switching power supply according to claim 1, further comprising a switch for disabling operation of said switching transistor.

14. A self-oscillation switching power supply according to claim 13, wherein the switch comprises a switch disposed remotely from the power supply.

15. A self-oscillation switching power supply according to claim 1, wherein the at least one control winding comprises a first feedback winding and a second control winding.

16. A self-oscillation switching power supply according to claim 1, wherein the at least one control winding comprises a single control winding.

17. A self-oscillation switching power supply according to claim 1, wherein the external voltage source is generated by an error amplifier comparing said output voltage detection signal comprising a signal related to an output voltage of said power supply to a reference voltage.

* * * * *